(No Model.) 2 Sheets—Sheet 1.
E. L. ABBOTT.
POWER METER.
No. 539,244. Patented May 14, 1895.
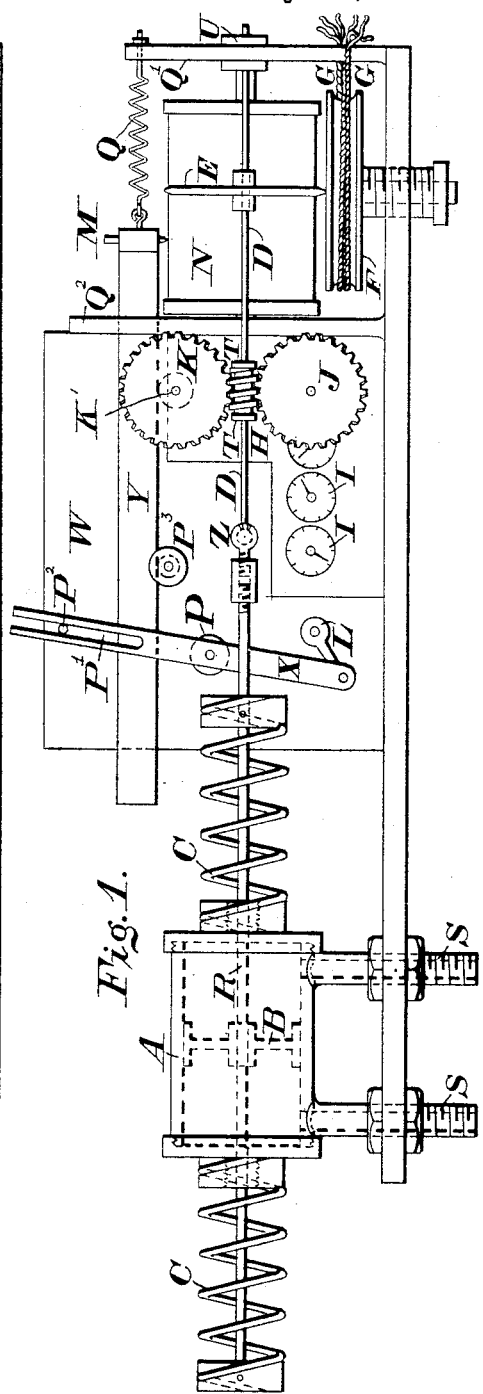
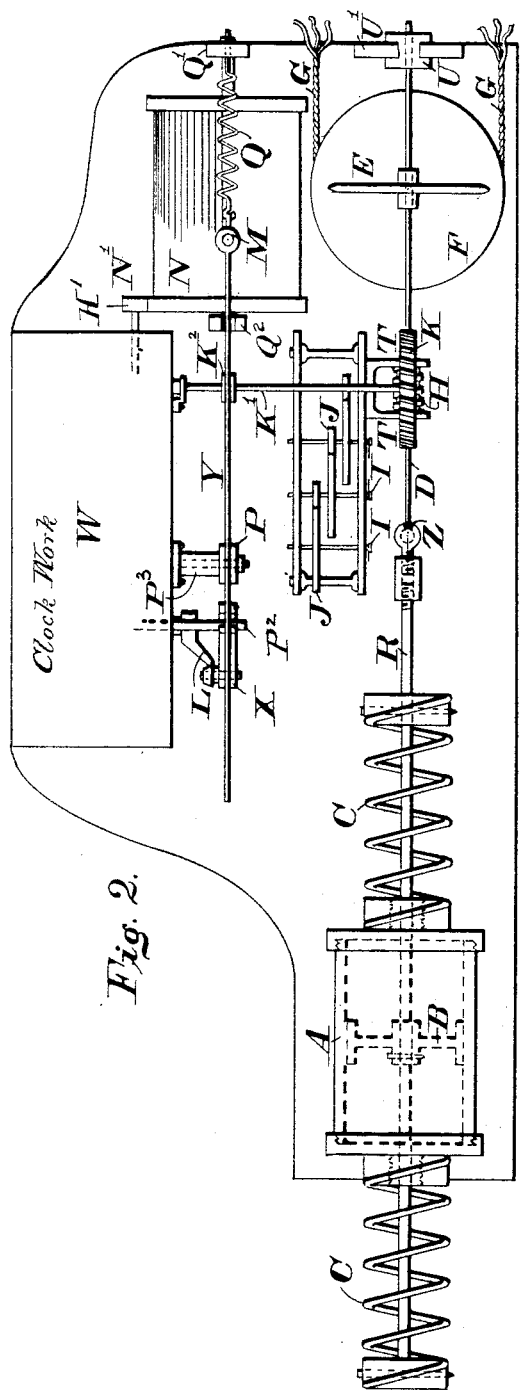
Witnesses
Geo. N. Morgan
D. M. Carter
Inventor
Edward L. Abbott (No Model.) 2 Sheets—Sheet 2.

E. L. ABBOTT.
POWER METER.

No. 539,244. Patented May 14, 1895.

Witnesses:—
Geo. N. Morgan
D. M. Carter

Inventor:—
Edward L. Abbott

UNITED STATES PATENT OFFICE.

EDWARD L. ABBOTT, OF CHICAGO, ILLINOIS.

POWER-METER.

SPECIFICATION forming part of Letters Patent No. 539,244, dated May 14, 1895.

Application filed July 23, 1894. Serial No. 518,326. (No model.)

*To all whom it may concern:*

Be it known that I, EDWARD L. ABBOTT, a citizen of the United States, residing at Chicago, county of Cook, and State of Illinois, have invented certain new and useful Improvements in Power-Meters, which are fully set forth in the following specification, reference being had to the accompanying drawings, forming a part thereof.

My invention relates to devices for measuring the power exerted by engines and I have shown it as particularly applied for that purpose in connection with reciprocating gas engines. It also indicates and records as, for example, by dials and upon paper, the variations of power from time to time. The net result of the application of my invention is to furnish a complete record of the power given out by the engine and the variations with which it is given out.

I have illustrated one form or application of my invention in the accompanying drawings, wherein—

Figure 4:
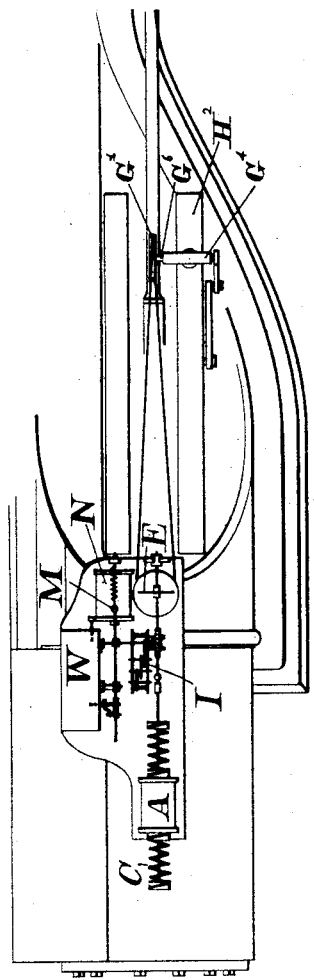
Figure 3:
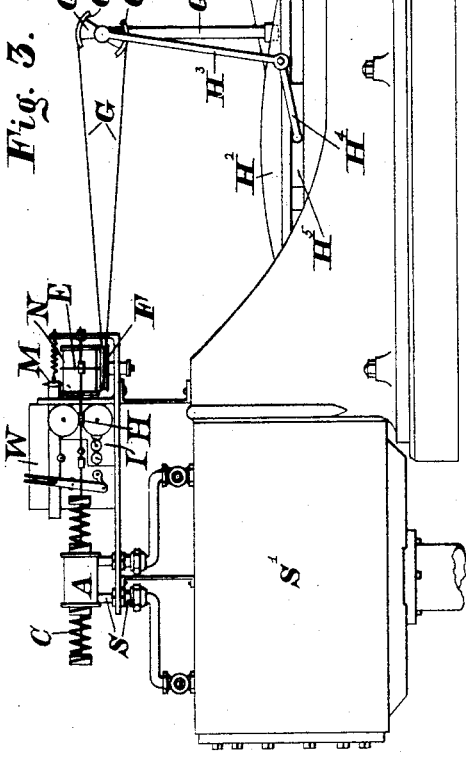

Figure 1 is a side elevation of the device, and Fig. 2 is a plan view. Fig. 3 shows the device connected to an engine. Fig. 4 is a plan view of the same with portion of the engine omitted.

In each figure certain parts are shown in dotted lines and the drawings are not intended to completely show all the parts but only enough to set out the operation of the device and make its construction plain.

A is a cylinder; B, a piston; C, springs on the piston rod R at opposite ends of the cylinder. The cylinder is provided with two pipes S S, one at each end, which pipes connect to the corresponding ends of the engine cylinder S', (see Fig. 3,) the output of power from which is to be measured.

I have shown springs, but of course other devices adapted to exercise or resist motive power might be employed and they might be placed within instead of without the cylinder.

A planimeter wheel E is connected to the piston rod R so as to reciprocate therewith while being free to rotate in a plane at right angles to its reciprocating motion. The planimeter wheel is actuated by contact with the plane surface of a disk wheel F which is rotated alternately in opposite directions during successive strokes of the engine by means of a rack and pinion or by the cord G as shown in Figs. 1, 2 and 3. I have shown in Fig. 3 an engine with the metering device connected ready for action. One end of the cord G is fastened to the segment wheel G' at $G^2$, the other end being fastened to said wheel at $G^3$. Said wheel G' is fastened to a shaft $G^6$ which works in a bearing $G^4$ supported by the post $G^5$. Said post is screwed into a hole in one of the cross head guides $H^2$. An arm $H^3$ is fastened to the shaft $G^6$ at one end, the other end being pivotally connected to the arm $H^4$ which is in turn pivotally connected to the cross head $H^5$. It will thus be seen that as the cross head $H^5$ moves back and forth the wheel G' will be rocked or oscillated, and hence the disk wheel F will be alternately rotated in opposite directions.

I have described in detail the connection between the disk wheel F and the cross head $H^5$, but it is evident that said disk wheel may be connected in any other desirable manner to a reciprocating post of the engine.

The motion of the planimeter wheel is communicated to the registering and to the recording device by means of a gear wheel H which is caused to rotate with the planimeter wheel. I have shown this wheel as rotating upon a pivot Z. The gear wheel H communicates motion to the wheels J J J and to the hands of the dials I I I in the registering device. The wheel H also communicates motion to the wheel K and shaft K'. This shaft is suitably connected with the pencil bar Y by means, for example, of the wheel $K^2$ which by friction or teeth engages the bar Y which controls the pencil M and is connected by means of a spring to the standard Q'.

N is a cylinder adapted to be rotated on its axis by means of the wheel II which is driven from the mechanism of the clock W. The cylinder N preferably carries a paper ribbon or covering.

L is a crank projecting from and driven at a uniform rate of speed by the clock mechanism W, and X is a bar connected therewith and reciprocated thereby.

P is a roller on the bar.

P' is a slot in the upper end of the bar.

$P^2$ is a pin adapted to slide in the slot.

P³ is a grooved roller in which the pencil bar Y is adapted to rest.

G is a cord about the disk F adapted to rotate the same.

The cylinder N is journaled in the standards Q' Q², and the rod D is supported but so as to move longitudinally in the block U of the standard U'.

It will be evident that these parts could be greatly altered without departing from the spirit of my invention and that different features could be used separately and yet the functions of the remaining features not be materially affected.

The use and operation of my invention are as follows: The cylinder A being connected at its ends with the corresponding ends of the power giving cylinder S', the piston B with the rod R reciprocates. The springs C C of course tend to restore the parts to their normal positions or the position of rest as indicated in the drawings. The planimeter wheel E being connected with the rod R, travels therewith and hence moves off the center of the disk F which central position it occupies normally when at rest. The disk F is driven by means of the cord G or otherwise from the reciprocating or driving part; that is, from some part driven by the cylinder of the engine whose output is to be metered. The resulting effect of these two forces, namely, that which moves the planimeter wheel E away from its normal position on the disk F and that which drives the disk F, causes the wheel E to rotate at a variable speed. This speed it is found is proportional to the power exerted or put forth by the engine under the conditions above suggested. This of course rotates the gear wheel H and sets in operation on the one hand the train of mechanism beginning with the gear wheel J and on the other hand the train of mechanism beginning with the gear wheel K. The rotation of the register, which term may be applied for convenience to the disks J J and dials I I, or to any such mechanism as may be employed to permanently register or indicate the total units of energy put forth, is determined by the speed of the planimeter wheel and hence by the power put forth by the engine. The rotation of the gear K and shaft K' and wheel K² will cause the pencil bar Y and pencil M to move in the proper direction, as for example, toward the left and the length of the excursion made in any given interval of time is proportional to the speed of rotation of the gear K and hence to the power put out by the engine. The motion imparted to the bar Y is in opposition to the spring Q. The clock mechanism W keeps the cylinder slowly rotating at a fixed rate. The clock mechanism also operating the crank L, rod X and roller P will at intervals lift the pencil bar Y from engagement with the wheel K² and permit it to be restored by the spring Q to its normal position.

The parts are so related that the operation of the pencil bar Y is intermittent at regular intervals of equal length. Hence a line drawn through the extremes of the lines penciled on the paper will give a curve or diagram of the output of the machine showing its variations. The total result therefore of the entire device is to produce a register of the total units of energy put forth by the engine and at the same time to display graphically the relative output at each successive interval of say ten minutes or the like.

What I claim, and wish to secure by Letters Patent of the United States, is—

1. In a metering device the combination of the cylinder A having free openings S S, one at each end, and containing a piston B, a piston rod R, connected to which are springs C C, the rod R having a pivoted extension D carrying a gear wheel H and planimeter wheel E in contact with a disk and pulley F; the train of wheels J J and dials I I in connection with gear wheel H; also in connection with gear wheel H the wheel K² in intermittent connection with pencil bar Y having pencil M, the bar F being intermittently connected with the clock W so as to be alternately lifted from and lowered into contact with wheel K².

2. In a metering device the cylinder A having free opening at each end and containing a piston B and piston rod R, connected to which are springs C C the rod R connected with the gear wheel H and a planimeter wheel E, said planimeter wheel in contact with a disk F and a train of wheels J J and dials I I.

3. The graphically recording device, consisting of the wheel K², the bar Y, pencil M with a cylinder N, geared to a clock W, the bar Y also in intermittent connection with a moving part connected to the clock W so as to be alternately lifted from and lowered into contact with wheel K².

4. The combination with an engine of an auxiliary cylinder having a reciprocating piston and rod therein and communicating at both ends with the main cylinder of the engine, a rotatable planimeter wheel connected with said piston rod so as to be reciprocated thereby, a disk in contact with said planimeter wheel and connected with a moving part of the engine so as to be alternately rotated in opposite directions, and a registering device connected with said planimeter wheel so as to be operated thereby, and a recording device for recording the variations in the power exerted by the engine also connected with said planimeter wheel so as to be moved intermittently.

5. The combination in a recording device of a clock mechanism, a rotatable cylinder connected with said clock mechanism, a bar carrying a pencil adapted to make contact with said cylinder, a spring or the like having one end attached to a fixed point and the other end to said bars, a wheel adapted to be rotated by the device in connection with which the recording device is used, said wheel adapted to engage said bar and move it against the tension of said spring, and a movable part connected with said clock mechanism and adapted to alternately move said bar out of and into engagement with said wheel.

6. The combination with an engine of an auxiliary cylinder having a reciprocating piston and rod therein and communicating at both ends with the main cylinder of the engine, a rotatable planimeter wheel connected with said piston rod so as to be reciprocated thereby, a disk in contact with said planimeter wheel connected with a moving part of the engine so as to be alternately rotated in opposite directions, a registering device connected with said planimeter wheel so as to be operated thereby, a recording device associated with said planimeter wheel and consisting of a clock mechanism, a rotatable cylinder connected therewith, a spring actuated bar carrying a pencil adapted to make contact with said cylinder, a driving wheel adapted to be rotated by the movement of said planimeter wheel, said driving wheel adapted to engage said bar and move it against the tension of its spring, and a movable part connected with said clock mechanism and adapted to alternately move said bar out of and into engagement with said driving wheel.

EDWARD L. ABBOTT.

Witnesses:
GEO. N. MORGAN,
DONALD M. CARTER.